Aug. 31, 1954
L. L. WHITNEY
2,687,564
METHOD OF MAKING SPRING BANDS
Filed Nov. 15, 1947
2 Sheets-Sheet 1
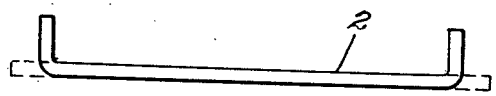
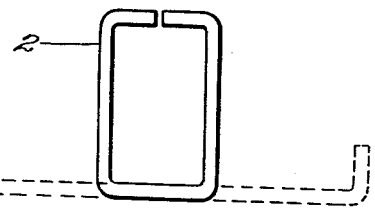
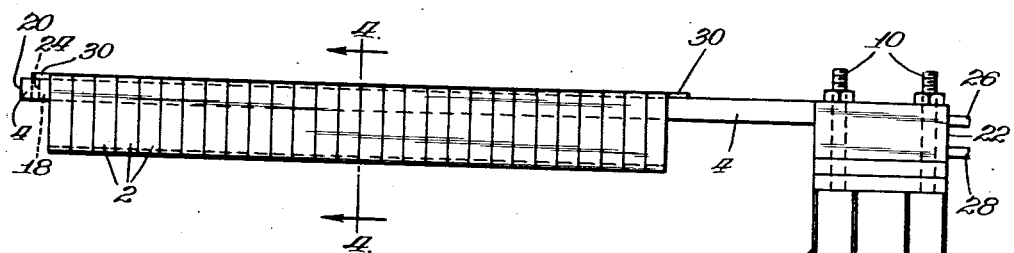
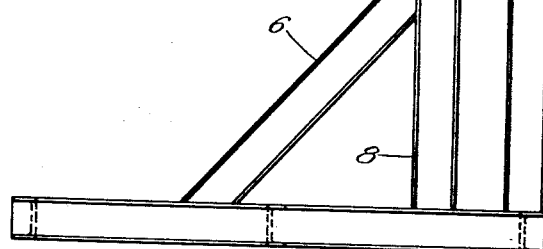
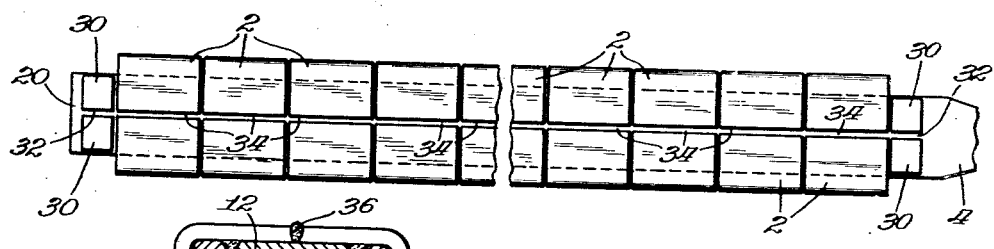
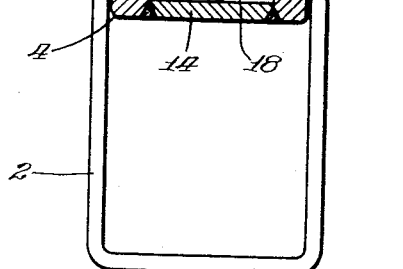
INVENTOR.
Loren L. Whitney
BY Aug. 31, 1954  L. L. WHITNEY  2,687,564
METHOD OF MAKING SPRING BANDS
Filed Nov. 15, 1947  2 Sheets-Sheet 2
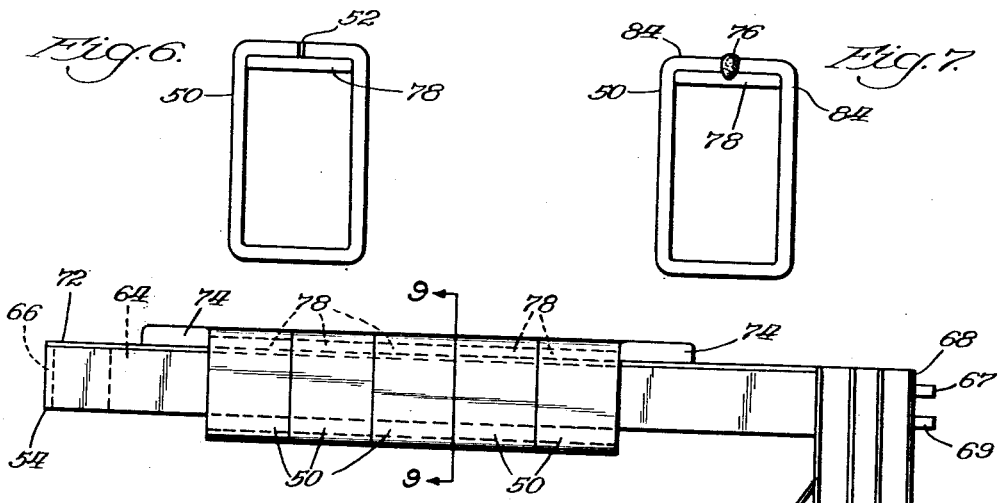
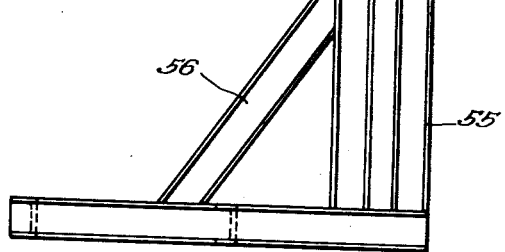
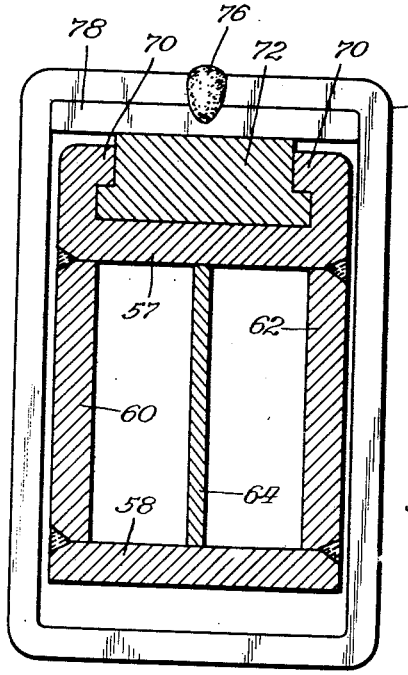
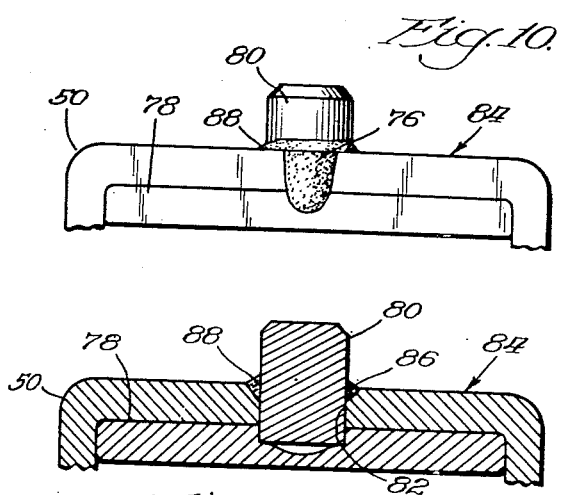
INVENTOR.
Loren L. Whitney
BY
Attÿ.

Patented Aug. 31, 1954

2,687,564

UNITED STATES PATENT OFFICE 2,687,564

METHOD OF MAKING SPRING BANDS

Loren L. Whitney, Hammond, Ind., assignor to American Steel Foundries, Chicago, Ill., a corporation of New Jersey Application November 15, 1947, Serial No. 786,208

2 Claims. (Cl. 29—172)

This invention relates to a method for making spring bands of the type used for banding elliptic or leaf springs.

A principal object of the invention is to devise a novel production method for fabricating spring bands quickly and economically in large quantities.

Another object of the invention is to provide a method of fabricating spring bands of the type described comprising the cutting of pieces of stock to length, then bending the pieces of stock into loops of quadrilateral form having spaced ends forming a gap, arranging said pieces of stock on a suitable support with the spaced ends of said bands arranged to form a channel and welding the ends of a plurality of said bands in one continuous operation.

A further object of the invention is to devise a method of making spring bands with thick heads by interposing a filler plate between the unjoined ends of each band and the support on which the bands are mounted and arranging these bands so that the weld joins not only the ends of the respective bands but also joins the associated filler plates thereto.

A different object of the invention is to devise a method of securing spring-positioning pins to the spring bands with thick heads such as described, which comprises drilling a bore through the head portion of the band and into the adjacent filler plate, countersinking the bore, inserting one end of the pin into the bore, and welding around the pin at the countersunk portion of the bore so that the weld will flow into said portion and level off substantially flush with the outer surface of the head portion of the band, thus effecting a good weld between the pin and the band and eliminating the necessity of grinding off any of the weld.

These and other objects of the invention will become apparent from the specification and the drawings, wherein:

Figures 1 and 2 illustrate the bending operations in fabricating one form of band from bar stock;

Figure 3 is a side elevation of a support rack with a plurality of preformed bands of the type shown in Figure 2 mounted thereon in position for welding;

Figure 4 is a sectional view through the band-supporting beam of the rack shown in Figure 3, the view being taken substantially on line 4—4 of Figure 3 with the ends of the bands welded;

Figure 5 is a fragmentary top plan view of the arrangement shown in Figure 3;

Figures 6 and 7 are end views of another form of band constructed in accordance with my invention, Figure 6 showing the band as unwelded and Figure 7 showing the band as welded;

Figure 8 is a side elevation of another type of welding rack with a plurality of bands of the type shown in Figure 6 arranged thereon preparatory for welding;

Figure 9 is a sectional view of Figure 8 taken in the plane substantially as indicated by line 9—9 of Figure 8 with the bands welded;

Figure 10 is a fragmentary end elevation of the band shown in Figure 7 with a spring-positioning lug applied thereto; and Figure 11 is a longitudinal vertical sectional view of Figure 10.

Describing the invention in detail and referring first to Figures 1 to 5, inclusive, each spring band 2 illustrated therein is made in the same manner, which includes cutting to length a piece of flat bar stock and bending it into a loop of rectangular form, thus bringing the ends of the stock together with a space therebetween for welding.

The bands 2, as thus shaped, are then sleeved onto a beam 4 forming part of a support rack, generally indicated 6 (Figure 3), the rack comprising a supporting stand 8 to which one end of the beam 4 is secured as by stud bolts 10, 10.

The beam 4 is of box section comprising interconnected top and bottom walls 12 and 14, spaced side walls 16, 16, an intermediate web 18, and end walls 20 and 22. The top wall 12 is preferably made of copper, on which the welding is to be performed to join the free ends of each band as hereinafter described, and is connected to the side walls, the end walls and web 18 in any convenient manner, as by brazing, and the bottom, side and end walls, which are preferably made of steel, may be connected to each other as by welding.

The web 18, which may also be of steel, terminates short of the end wall 20 of the beam 4 as at 24 (Figure 3) and serves as a baffle for directing coolant fluid, such as water, circulated through the beam by means of inlet and outlet conduits 26 and 28 secured to the end wall 22 at opposite sides of the web 18 respectively.

It will be observed from a consideration of Figures 3 and 4 that the bands 2 are inserted end to end on the beam 4 with their split sides or unjoined ends uppermost and are aligned longitudinally of the beam.

In preparing this group of bands for welding the ends of each band, a pair of scrap blocks 30, 30 of the same thickness as the bands are placed at each end of the group in abutment with the adjacent band and are spaced transversely of the beam, leaving a gap as at 32 aligned longitudinally of the beam with gaps 34 between the free ends of each band.

The welding, which fuses the unjoined ends of the bands to each other, is begun on one pair of blocks and continued across the bands, filling the gaps 32 and 34 between the blocks 30, 30 and the ends of the respective bands with weld 36 (Figure 5), the welding continuing on the other pair of blocks to insure that the bands at each end of the group have a uniform and fully filled weld.

Inasmuch as the weld does not adhere to the copper top wall of beam 4, the group of bands, after welding, will be joined together by one continuous weld. This string of bands is removed from the beam and may be dropped on a block (not shown) to break them apart, or may be broken apart by hand or sheared apart in any convenient manner, as by a shearing apparatus (not shown). Any burrs may be easily removed by spot grinding.

Referring now to Figures 6 to 11, the spring bands 50 are fabricated in general in the same manner as the bands 2, that is, each band 50 is made from a piece of band stock, cut to length and bent into a loop, the ends being bent toward each other but leaving a small gap 52 therebetween for welding.

The bands 50, as thus preformed, are sleeved onto a beam 54 forming part of a support rack generally designated 55 and comprising a stand 56 integral with one end of the beam 54. The beam 54 may be of box section having interconnected top and bottom walls 57 and 58, spaced side walls 60 and 62, an intermediate wall 64, and end walls 66 and 68. The wall 64 is terminated short of the end wall 66 and serves as a baffle for directing coolant fluid, such as water, from end to end of the beam 54 by means of inlet and outlet conduits 67 and 69 secured to the end wall 68 at opposite sides of wall 64 respectively.

The side walls 60 and 62 may extend above the top wall 58 and may have inturned flanges 70, 70 between which and the top wall may be inserted a copper bar 72 which may have its top surface above the top surfaces of flanges 70, 70.

In sleeving the bands 50 onto the beam, care is taken to so dispose these bands on the beam that the unwelded ends thereof rest on the copper bar 72 and adjacent bands abut against each other end to end and the gaps 52 between the free ends of each band 50 are aligned with each other longitudinally of the beam. A pair of scrap blocks 74, 74 are placed at each end of the group and spaced transversely of the beam to define a gap therebetween in alignment with gaps 52 in the same manner as the blocks 30, 30 in the first modification. To form a thick head on each band, a filler plate 78 is inserted between the underside of the unwelded ends of each band and the copper bar. This is preferably done as each band is placed on the beam. The welding proceeds as hereinbefore related in connection with the first embodiment by depositing weld metal 76 in gaps 52. It will be noted, however, that the weld in the present instance connects each filler plate and the adjacent ends of the associated band. Removal of these bands from the beam and separation of the same proceeds in the same manner as hereinbefore stated in connection with the first embodiment.

A spring-positioning plug or pin 80 is secured to each band 50 by drilling an opening or bore 82 into the thick head portion 84 of the band, the bore being disposed substantially centrally of the head portion and extending through the band proper and into the filler plate. One end of the plug is inserted into the bore which is countersunk at its upper or open end as at 86. The countersunk portion of the bore is filled with weld metal 88 connecting the plug with the band 50.

Thus it will be seen that I have devised a method which facilitates fabricating spring bands in large quantities efficiently, economically and rapidly.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In the manufacture of spring bands of the type adapted to secure a set of superimposed spring members, the method which comprises cutting a bar of metal into segments, then bending each segment into a loop of quadrilateral form with the free ends of each loop spaced from each other to define a gap therebetween, then arranging the loops in a group end to end on a nonweldable support with the gaps between the free ends of said loops in alignment with each other, then arranging a set of blocks on said support at each end of the group, spacing each set of blocks to define a gap therebetween in alignment with said aligned gaps of said loops, then continuously welding said blocks and ends of said loops by depositing welding metal in said gaps beginning on one set of said blocks and continuously welding each succeeding loop by depositing welding metal in the gap between the free ends thereof and terminating on the other set of blocks in the gap therebetween, and then removing said loops and blocks from said support and breaking the weld metal interconnecting the same.

2. In the manufacture of spring bands of the type adapted to secure a set of superimposed spring members, the method which comprises cutting a bar of metal into segments, then bending each segment into a loop of quadrilateral form with the free ends of each loop spaced from each other to define a gap therebetween, then arranging the loops in a group end to end on a nonweldable support with the gaps between the free ends of said loops in alignment with each other, then arranging a set of blocks on said support at each end of the group, spacing each set of blocks to define a gap therebetween in alignment with said aligned gaps of said loops to define a channel therewith extending longitudinally of the group, then filling all of said gaps with weld metal by welding in a continuous line from one end of the channel to the other, and then removing said loops and blocks from said support and breaking the weld metal interconnecting the same.

References Cited in the file of this patent

UNITED STATES PATENTS

| Number | Name | Date |
| --- | --- | --- |
| 432,656 | Thomson | July 22, 1890 |

(Other references on following page)

UNITED STATES PATENTS

| Number | Name | Date |
|---|---|---|
| 540,278 | Sloan | June 4, 1895 |
| 720,914 | Harty | Feb. 17, 1903 |
| 832,418 | Richards et al. | Oct. 2, 1906 |
| 1,290,091 | Cole | Jan. 7, 1919 |
| 1,377,266 | Mossberg | May 10, 1921 |
| 1,581,916 | Broussouse | Apr. 20, 1926 |
| 1,708,115 | Baldwin | Apr. 9, 1929 |
| 1,734,008 | Frehse | Oct. 29, 1929 |
| 1,745,783 | Clark | Feb. 4, 1930 |
| 1,795,332 | Deppeler | Mar. 10, 1931 |
| 1,931,162 | Kranz et al. | Oct. 17, 1933 |
| 2,052,380 | Chapman | Aug. 25, 1936 |
| 2,060,561 | Fausset | Nov. 10, 1936 |
| 2,095,585 | Yates | Oct. 12, 1937 |
| 2,177,191 | Sandberg | Oct. 24, 1939 |
| 2,187,740 | Hothersall | Jan. 23, 1940 |
| 2,226,496 | Jacocks | Dec. 24, 1940 |
| 2,276,050 | Leighton | Mar. 10, 1942 |
| 2,357,170 | Burggraf | Aug. 29, 1944 |
| 2,571,475 | O'Donnell | Oct. 16, 1951 |

FOREIGN PATENTS

| Number | Country | Date |
|---|---|---|
| 336,483 | Germany | May 9, 1922 |
| 591,814 | Germany | Jan. 27, 1934 |

OTHER REFERENCES

"Laminated Springs" (Book) by Sanders, 1923, pub. by The Locomotive Pub. Co., London, England, pp. 479. (Copy in Div. 45.)

The Weld. Ency. (Book) 9th Ed. received June, 1940, published by The Welding Engineer Pub. Co., p. 481. (Copy in Div. 14.)